US006813054B2

(12) United States Patent
Aksyuk et al.

(10) Patent No.: US 6,813,054 B2
(45) Date of Patent: Nov. 2, 2004

(54) MICRO-ELECTRO-MECHANICAL DEVICE HAVING IMPROVED TORSIONAL MEMBERS AND A METHOD OF MANUFACTURING THEREFOR

(75) Inventors: Vladimir A. Aksyuk, Piscataway, NJ (US); Arman Gasparyan, New Providence, NJ (US); Mark A. Paczkowski, Andover, NJ (US)

(73) Assignees: Agere Systems Inc., Allentown, PA (US); Lucent Technologies Inc., Murray Hill, NJ (US)

(*) Notice: Subject to any disclaimer, the term of this patent is extended or adjusted under 35 U.S.C. 154(b) by 12 days.

(21) Appl. No.: 10/103,099

(22) Filed: Mar. 21, 2002

(65) Prior Publication Data

US 2003/0179431 A1 Sep. 25, 2003

(51) Int. Cl.⁷ .............................................. G02B 26/08
(52) U.S. Cl. ..................... 359/224; 359/198; 359/872; 359/876; 385/18
(58) Field of Search ................... 359/224, 196–198, 359/871, 872, 876, 223; 385/16, 18

(56) References Cited

U.S. PATENT DOCUMENTS

| 6,201,631 B1 | 3/2001 | Greywall | |
| 2001/0040675 A1 * | 11/2001 | True et al. | 355/77 |
| 2002/0181848 A1 * | 12/2002 | Lemoff et al. | 385/18 |

OTHER PUBLICATIONS

C. Serre, S. Barrett and R. Herino; "Influence of the Electroltyte Compositions and pH on the Anodic dissolution of P–Type Si in Aqueous HF Solutions"; Journal of Electroanalytical Chemistry, 370 (1994); pp. 145–149.

B.C. Chung, G.A. Marshall, C.W. Pearce and K.P. Yanders; "The Prevention of Si Pitting in Hydrofluric Acid Cleaning by Additions of Hydrochloric Acid", J. Electrochem. So., vol. 144, No. 2, Feb. 1997; pp. 652–657.

Valerie Bertagna, Rene Erre, Feancois Rouelle and Marius Chemla; Corrosion Rate of and P–Silicon Substratres in HF HF+HC1, and HF +NH4F Aqueous Solutions; Journal of the Electrochemical Society, 146(1999); pp. 83–90.

* cited by examiner

Primary Examiner—Audrey Chang
Assistant Examiner—Denise S. Allen

(57) ABSTRACT

The invention addresses a micro-electro-mechanical (MEMS) device, or an array of such devices, for use in an optical communication system and a method of manufacture therefore. An embodiment of the device includes a moveable element support structure, a moveable element and torsional members that couple the moveable element support structure and the moveable element and allow the moveable element to gimbal with respect to the support structure. The inventive device includes torsional members that are substantially free of corrosion thereby producing a device with improved response characteristics. The method includes using an etchant that substantially inhibits corrosion of the torsional members.

23 Claims, 12 Drawing Sheets

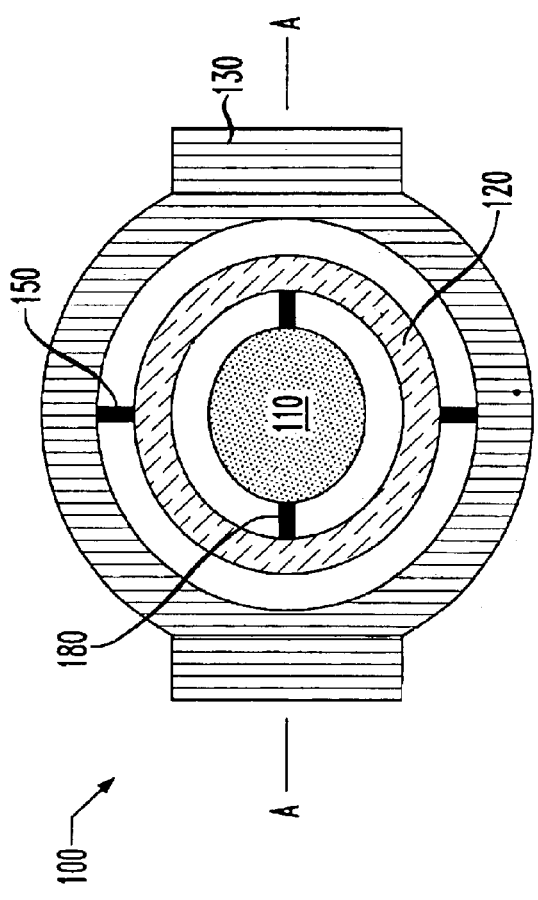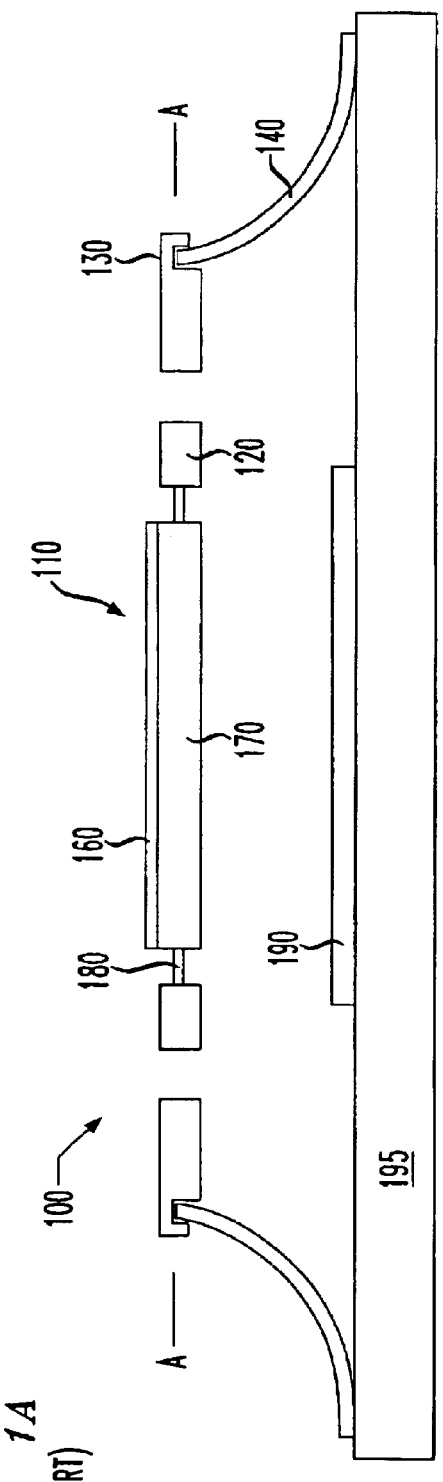
FIG. 1B (PRIOR ART)
FIG. 1A (PRIOR ART)

MICRO-ELECTRO-MECHANICAL DEVICE HAVING IMPROVED TORSIONAL MEMBERS AND A METHOD OF MANUFACTURING THEREFOR

TECHNICAL FIELD OF THE INVENTION

The present invention is directed, in general, to a micro-electro-mechanical device and, more specifically, to a micro-electro-mechanical device having improved torsional members and a method of manufacture therefore.

BACKGROUND OF THE INVENTION

Optical communication systems typically include a variety of optical devices, for example, light sources, photo-detectors, switches, cross-connects, attenuators, mirrors, amplifiers, and filters. These optical devices transmit optical signals within the optical communications systems. Some optical devices are coupled to electro-mechanical structures, such as thermal actuators, forming an electro-mechanical optical device. The term electro-mechanical structure, as used herein, refers to a structure that moves mechanically under the control of an electrical signal.

Some electro-mechanical structures move the optical devices from a predetermined first position to a predetermined second position. Cowan, William D., et al., "Vertical Thermal Actuators for Micro-Opto-Electro-Mechanical Systems," SPIE, Vol. 3226, pp. 137–146 (1997), describes one such electro-mechanical structure useful for moving optical devices in such a manner.

These micro-electro-mechanical systems (MEMS) optical devices often employ a periodic array of micro-machined mirrors, each mirror being individually movable in response to an electrical signal. For example, the mirrors can each be cantilevered and moved by an electrostatic, piezoelectric, magnetic, or thermal actuation. See [articles by] Lin, L. Y., et al., 10 IEEE Photonics Technology Lett. 525 (1998); Miller R. A., et al., 36 Optical Engineering 1399 (1997); Judy, J. W. et al., A53 Sensors and Actuators 392 (1996), which are incorporated herein by reference.

FIGS. 1A and B illustrate a prior art MEMS optical device 100 and its application. The device 100 comprises a mirror 110 movably coupled to a surrounding silicon frame 130 via torsional members 150, a gimbal 120 and torsional members 180. Typically, the mirror 110 includes a light-reflecting mirror surface 160 coated over a polysilicon membrane 170, which is typically of circular shape. The two torsional members 180 on opposite sides of the mirror 110 connect the mirror 110 to the gimbal 120, defining the mirror's primary axis of rotation. The gimbal 120, in turn, is coupled to the surrounding silicon 130 frame via a second pair of torsional members 150 (FIG. 1B) defining a secondary axis of rotation orthogonal to that of the primary axis of rotation.

These components are fabricated on a substrate (195) by known micromachining processes such as multilayer deposition by evaporation, sputtering, electrochemical deposition, or chemical vapor deposition and subsequent selective etching. Some of the polysilicon layers used in this process are separated spatially by phosphorous-doped silica glass. This glass is used as a sacrificial layer that is removed during an etching process sometimes referred to as the release process.

After etching, the components, are raised above the Substrate 195 by lift arms 140 that are composed of two dissimilar metal layers deposited over a polysilicon base. Alternatively, the etching process, may produce vertical support structures. In either case, the mirror 110 or gimbal 120 may be rotated out of plane of the support structure by an electrostatic force applied between the mirror 110 and electrode 190, and the rotation may be controlled by the restoring force of the torsional members 150, 180. Thus, using the typical MEMS mirror, the light beam of the optical signal can be transmitted to other devices in the optical system.

However, one problem associated with the fabrication of such devices relates to the corrosion of the polysilicon containing components and in particular, the torsional members 150, 180, during conventional etching (i.e., release) processes. In optical applications, various metals need to be applied to meet the optical and mechanical properties of the device. The use of multiple metals on silicon and the subsequent immersion of such a structure in a highly conductive and corrosive etching solution (in this case hydrofluoric acid; HF) can result in multiple electrochemical reactions. These reactions can accelerate the etching of a particular material in the structure.

The controlled release of silicon micromachines by HF has been well-documented. See D. J. Monk, Controlled Structure Release for Silicon Micromachining, Ph.D. Dissertation Thesis, University of California at Berkeley, passim and references sited therein (1993), all of which are incorporated herein by reference. The general chemical reaction that occurs is as follows:

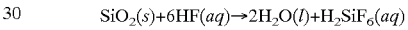

$SiO_2(s) + 6HF(aq) \rightarrow 2H_2O(l) + H_2SiF_6(aq)$

In this case, HF is the reactive species. It is also known that solutions of HF also contain $H_3O^+$, $F^-$ and $HF_2^-$, with the concentrations of each species dependent on the bulk concentration of HF. $F^-$ and $HF_2^-$ are known to react with silicon under certain conditions, and the reaction of $F^-$ with silicon liberates electrons. When noble metals such as gold are coated on the silicon, an electrochemical cell is created wherein the fluorine attacks silicon liberating electrons which migrate to the gold surface and reduce protons to produce hydrogen gas. This structure then accelerates the attack of fluorine on silicon. It is believed that phosphorus doping accelerates the attack of fluorine on silicon by weakening the silicon-silicon bonds. See Torcheax, L et al., 142(6) J. Electrochemical. Soc. 2037 (1995); Chung, B. C. et al., 144(2) J. Electrochemical. Soc. 652 (1997); Bertagna, V. et al., 146(1) J. Electrochemical. Soc. 83 (1999), all incorporated herein by reference.

In the example described above, corrosion has been found to affect the properties of the MEMS mirrors due to changes in the torsional member's mechanical properties. Such changes may cause the finished device to fail to meet desired performance specifications. Even where such finished devices are within design tolerances, corrosion and degradation may cause the response of each mirror in the optical system to vary largely when the actuating means is applied. Clearly, such characteristics are not desirable.

Accordingly, what is needed in the art is a MEMs device that does not suffer from such degradation during the method of manufacture therefor.

SUMMARY OF THE INVENTION

To address the above-discussed deficiencies of the prior art, the present invention provides a micro-electro-mechanical (MEMS) device that includes a moveable element, such as a mirror, supported by a moveable element support structure and torsional members connected to the moveable element that are substantially free of corrosion. These improved torsional members allow the moveable element to be moved relative to the support structure in a more efficient and accurate manner.

The present invention also provides a method of fabricating a micro-electro-mechanical device that includes forming a plurality of layers on a supporting substrate wherein at least a portion of one layer is a sacrificial layer, defining at least one torsional member in at least one layer of the layers that is not the sacrificial layer. A moveable element is defined in at least one of the layers that is not the sacrificial layer, wherein said moveable element is attached to the torsional member. The sacrificial layer is then removed to permit the movable element to move relative to the substrate. The structure is formed from a combination of dissimilar materials (e.g. the moveable element is a silicon or polycrystalline material on which a metal is formed). In the context of the present invention, dissimilar materials are materials with different reduction-oxidation (RedOx) potentials that create an electrochemical cell in the presence of the etchant for removing the sacrificial layer. In the embodiment of the present invention wherein the moveable element is a gold plated mirror and the torsional member is polycrystalline silicon, the corrosion of the polycrystalline silicon member by the etchant is enhanced by the presence of the gold in the structure. According to the present invention, the sacrificial layer is removed using an etchant mixture including an anion suppressant, wherein the anion Suppressant is selected to inhibit corrosion of the torsional member by the etchant solution.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 1A illustrates a schematic representation of a prior art micro-electro-mechanical optical switch;

FIG. 1B illustrates an overhead view, taken along section lines A—A, schematic representation of a prior art micro-electro-mechanical optical switch,;

DETAILED DESCRIPTION

The following description is directed to an embodiment wherein the MEMS device is an optical device. However, the principles of the present invention may be applied to any MEMS device wherein an etch is employed to form a portion of the device that is susceptible to corrosive effects of the etchant.

Figure 2A:
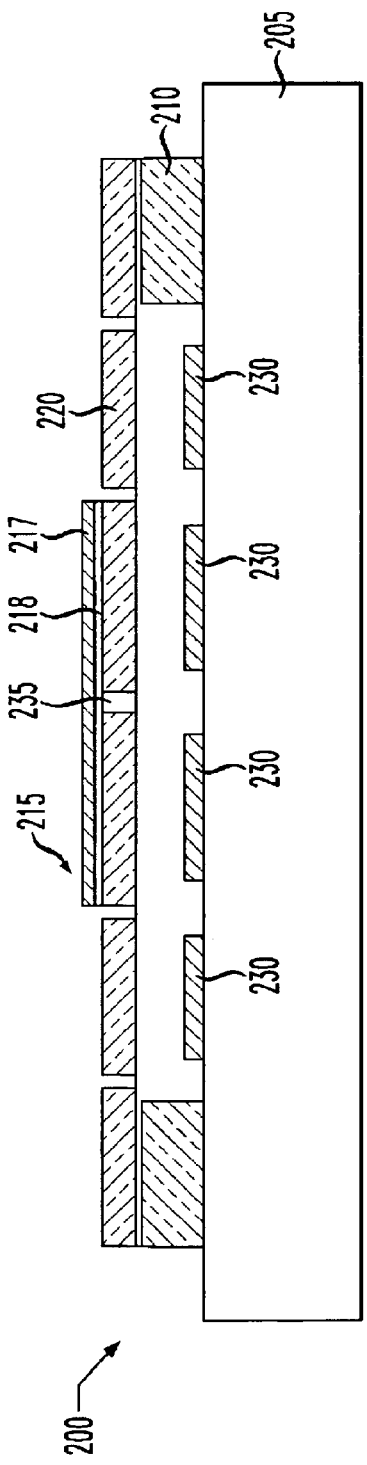
FIG. 2A illustrates a schematic representation of an embodiment of a micro-electro-mechanical device constructed according to the present invention.
Figure 2B:
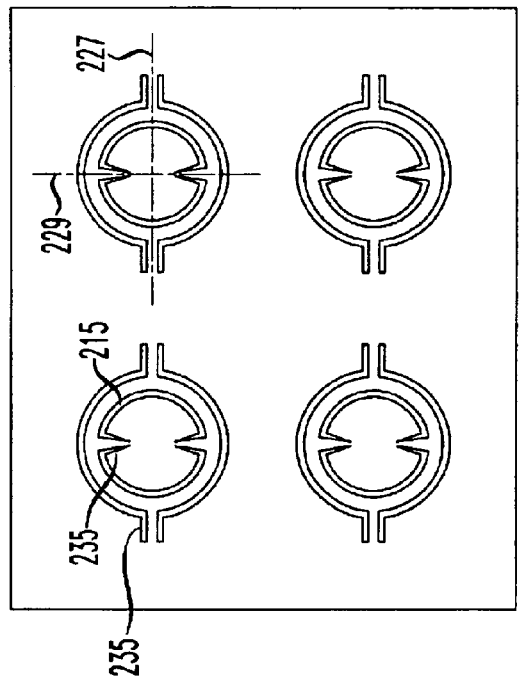
FIG. 2B illustrates an overhead view of an array of micro-electro-mechanical device of FIG. 2A constructed according to the present invention.
Figure 2C:
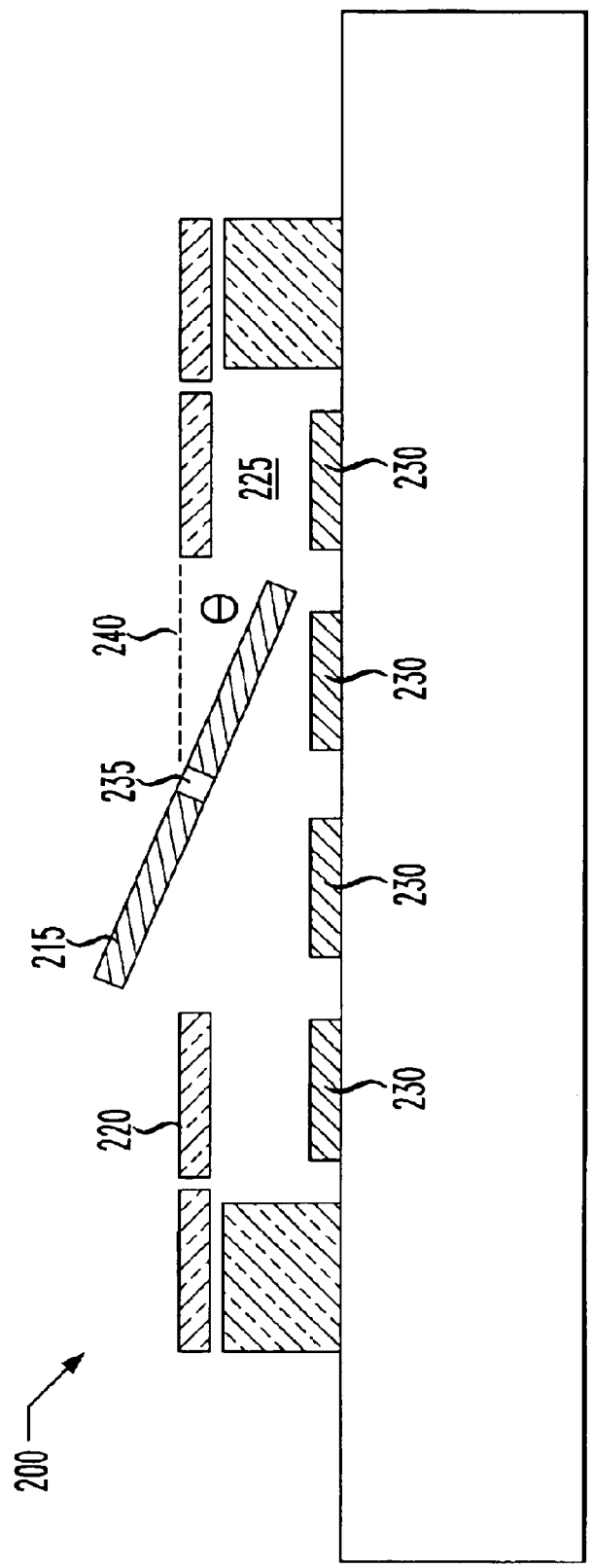
FIG. 2C illustrates a side view of the micro-electro-mechanical device of FIG. 2A shown in an activated or titled position.

One configuration of a MEMS device is described with reference to FIGS. 2A, 2B, and 2C illustrated is an exemplary embodiment of an optical MEMS device 200. In the illustrated Embodiment, the MEMS device 200 is formed on a base substrate 205, to which a support substrate 210 is affixed. The MEMS device 200 includes a moveable element 215, which has a reflective layer 217 and may be optionally adhered to the moveable element 215 by an adhesion layer 218. The moveable element 215 may be a silicon material, such as a polysilicon, and the reflective layer 217 may be comprised of gold, silver, rhodium platinum, copper or aluminum. In those embodiments where the adhesion layer 218 is present, the adhesion layer 218 may be comprised of chromium or titanium. The reflective layer 217 may be formed using conventional processes. For instance, the reflective layer 217 can be deposited by known thin film deposition methods, such as evaporation, sputtering, electrochemical deposition, or chemical vapor deposition. Moreover, the reflective layer 217 is typically formed to a thickness ranging from about 20 nm to about 2000 nm.

The moveable element 215 is supported by a supporting structure 220, such as a gimbal. The gimbal, in turn, is supported by the support substrate 210. A cavity 225 underlies the moveable element 215 and has a diameter at least about the same size as that of the overlying moveable element 215 and a height that depends on the size of the moveable element 215. The base substrate 205 also includes a plurality of electrodes 230 as well as a plurality of electrical interconnections (not shown).

The supporting structure 220 includes pairs of torsional members 235 (depicted as rods) in FIG. 2B. A first pair of torsional members 235 couple the moveable element 215 to the supporting structure 220, and a second pair of torsional members 235 couple the supporting structure 220 to the support substrate 210. The two pairs of torsional members 235 are positioned so as to provide rotation about two axes 227, 229. It should, of course, be understood that the MEMS device 200 may be configured into an array of such devices, as shown in FIG. 2B or other types of MEMS devices, such as the one illustrated in FIG. 1A. Additional information regarding the above-described MEMS device 200 by be found in U.S. Pat. No. 6,201,631, which is incorporated herein by reference.

FIG. 2C shows the MEMS device 200 in an activated position. In this particular illustration, the moveable element 215 is shown in a tilted position with respect to the supporting structure 220. The moveable element 215 can be tilted to an angle theta ($\theta$) 240 by applying a potential between the moveable element 215 and the electrodes 230. The degree of tilt can be varied by adjusting the electrical potential applied between the moveable element 215 and the electrodes 230.

In the illustrative embodiment shown in FIGS. 2A and 2B, the moveable element 215 may be coupled to the supporting structure 220 via the torsional members 235 that allow the moveable element 215 to gimbal about supporting structure 220. The torsional members 235 may be formed of a doped polysilicon material. In one embodiment, the dopant may be phosphorous. The dopant concentration may also range up to about 1.0 atomic weight percent.

Importantly, the torsional members 235 of the present device are substantially free of corrosion. As used herein, and further illustrated in the Examples section to follow, the term substantially free of corrosion is defined in terms of the response characteristics of a MEMs device incorporating such torsional members 235. In the case of a moveable element supported by torsional members 235, as shown in FIGS. 2A, 2B and 2C, if a fixed voltage is applied to the electrodes 230 as to tilt the moveable element in a certain direction, this fixed voltage will not give a single tilt angle to the moveable element but a range of tilt angles. In one particular embodiment, the moveable element 215 rotates around the primary axis 227, 229 to within 25% of a primary tilt angle produced in response to a repeated electrostatic field generated at a resonance frequency generated by a fixed voltage applied to the electrodes 230. The distribution of tilt angles for a fixed voltage depends on the extent of corrosion of material from which the torsional members 235 are made.

Figure 3:
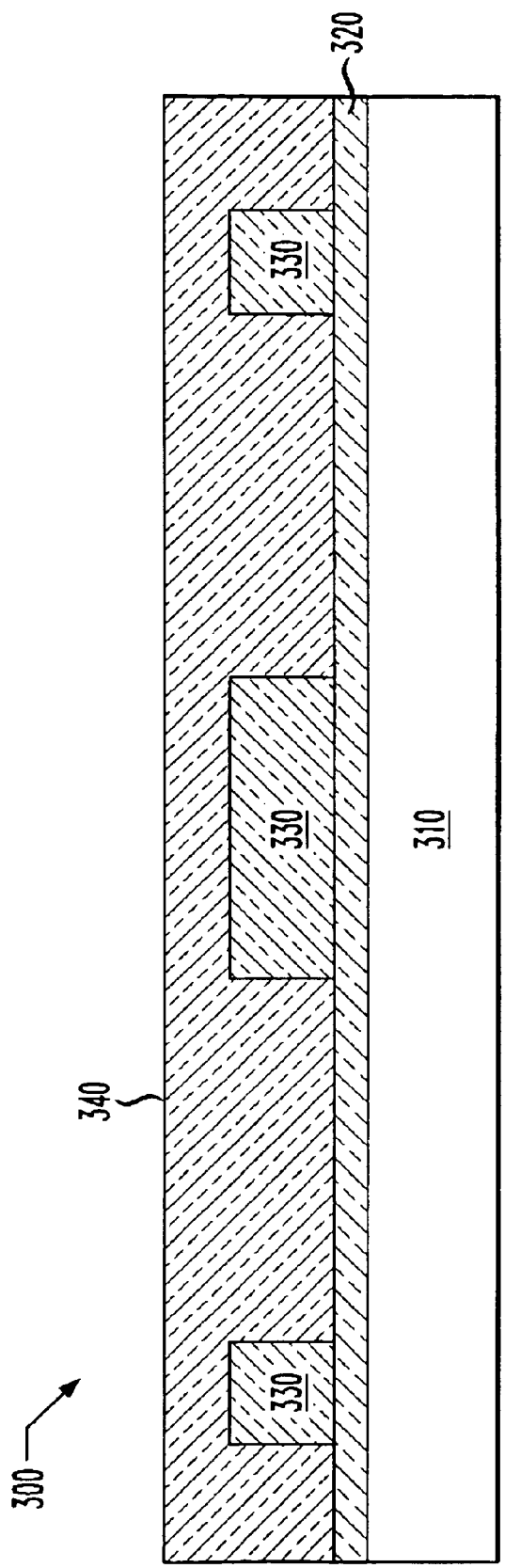
FIGS. 3–8 illustrate an embodiment of a MEMS optical switch constructed according to the present invention at various stages of manufacture.
Figure 8:
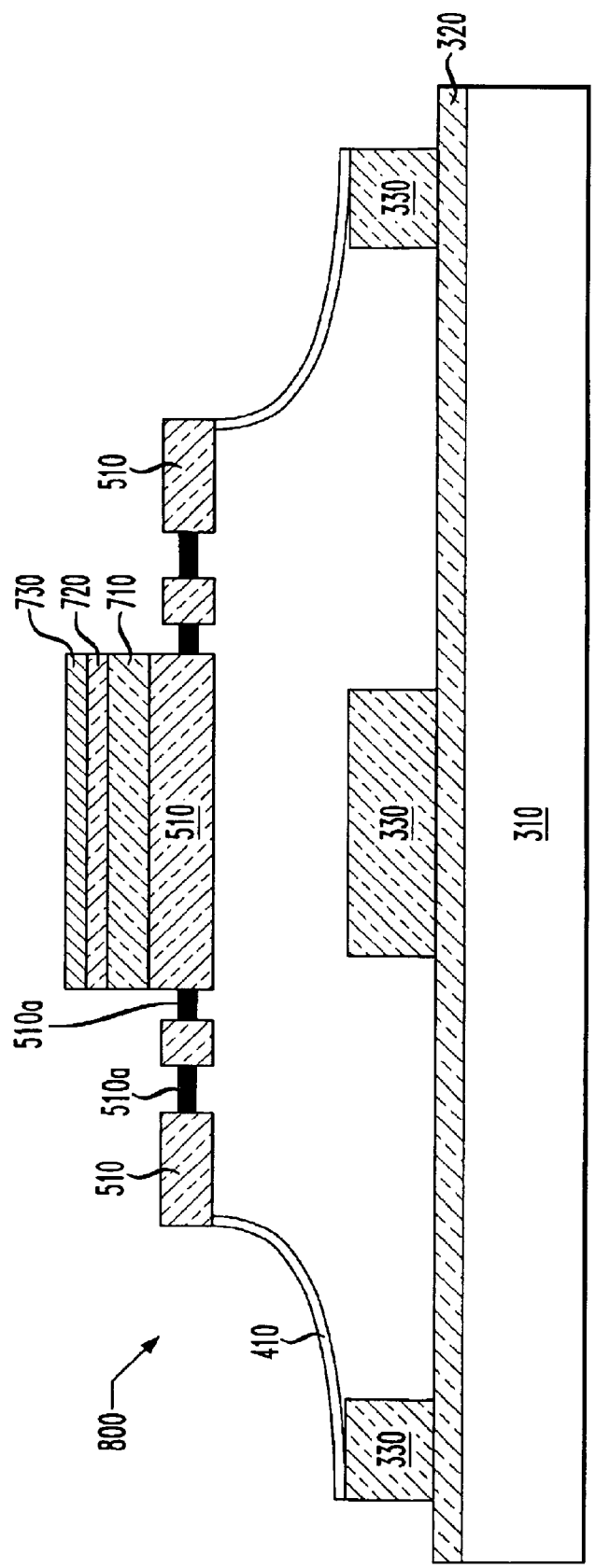

Turning now to the fabrication process, FIG. 3 illustrates an embodiment of a device 300 envisioned by the present invention at an initial stage of manufacture and which is shown in its completed form in FIG. 8. At this stage, a barrier layer 320 may be provided and patterned over a substrate 310. When present, the barrier layer 320 may be formed of a silicon nitride material and have a thickness of approximately 650 nm. One skilled in the art will understand that the barrier layer 320 will also be formed to have contact regions (not shown) where the substrate is exposed. While the substrate 310 may be n-doped silicon, any material suitable for use in a MEMS device may be employed without departing from the scope of the present invention. A polysilicon layer 330 may be then be formed over the barrier layer 320 and within the contact regions to electrically couple the substrate and the polysilicon layer 330. The polysilicon layer 330 may be about 0.5 μm thick.

Following the deposition and patterning of polysilicon layer 330, a first insulating layer 340 may then be deposited thereover. In certain embodiments the insulating layer 340 may be a phosphorous-doped silicon glass (PSG) which may be patterned by conventional means.

Figure 4:
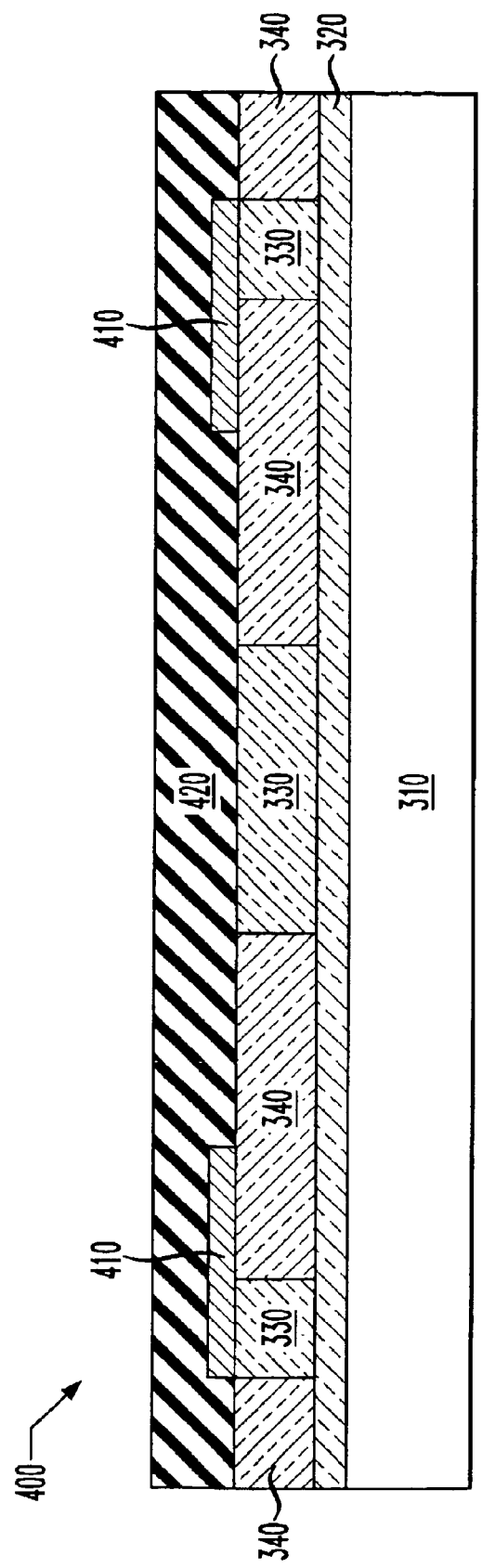

FIG. 4 schematically illustrates the device 400 at an intermediate stage of manufacture after the insulating layer 340 has been etched and regions 410 have been deposited and patterned. In the finished device as shown in FIG. 8, regions 410 form a conventional lift arm structure. Once regions 410 have been formed, a second insulating layer 420 may be formed. In certain embodiments insulating layer 420 may comprise a PSG layer.

Figure 5:
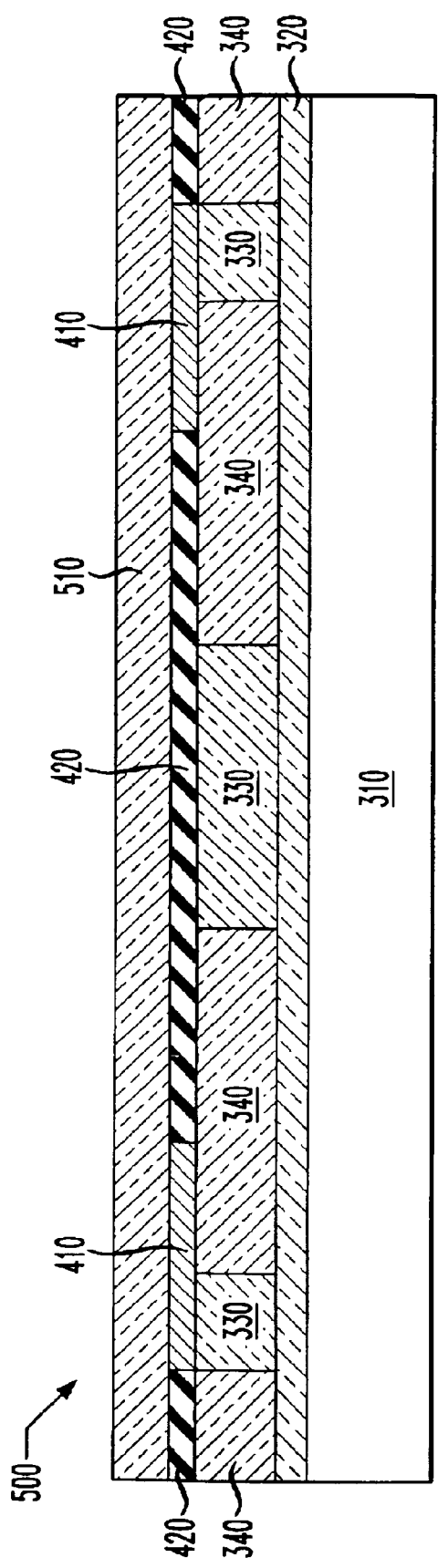

Now turning to FIG. 5, with continuing reference to FIGS. 2–4, processing of an embodiment of the device 500 is continued by having portions of the insulating layer 420 removed to expose the surface of regions 410. Removal of portions of insulating layer 420 may be accomplished by any means known in the art. Once the desired portions of the insulating layer 420 have been removed, an undoped polysilicon layer ("poly-1") 510 may be deposited by conventional methods and patterned to form torsional members and at least a portion of a moveable element in the finished device, as depicted in FIG. 8 and described below. One skilled in the art readily understands how such layers may be deposited.

The structure may then be annealed according to conventional methods well known in the art. It is believed that this annealing causes a portion of the phosphorous in the insulating layer 420 to diffuse into adjacent polysilicon layers. Where the insulating layer 420 is formed of phosphorus-doped silicon dioxide, it is believed that the phosphorous is the component that diffuses into the adjacent polysilicon layers.

Figure 6:
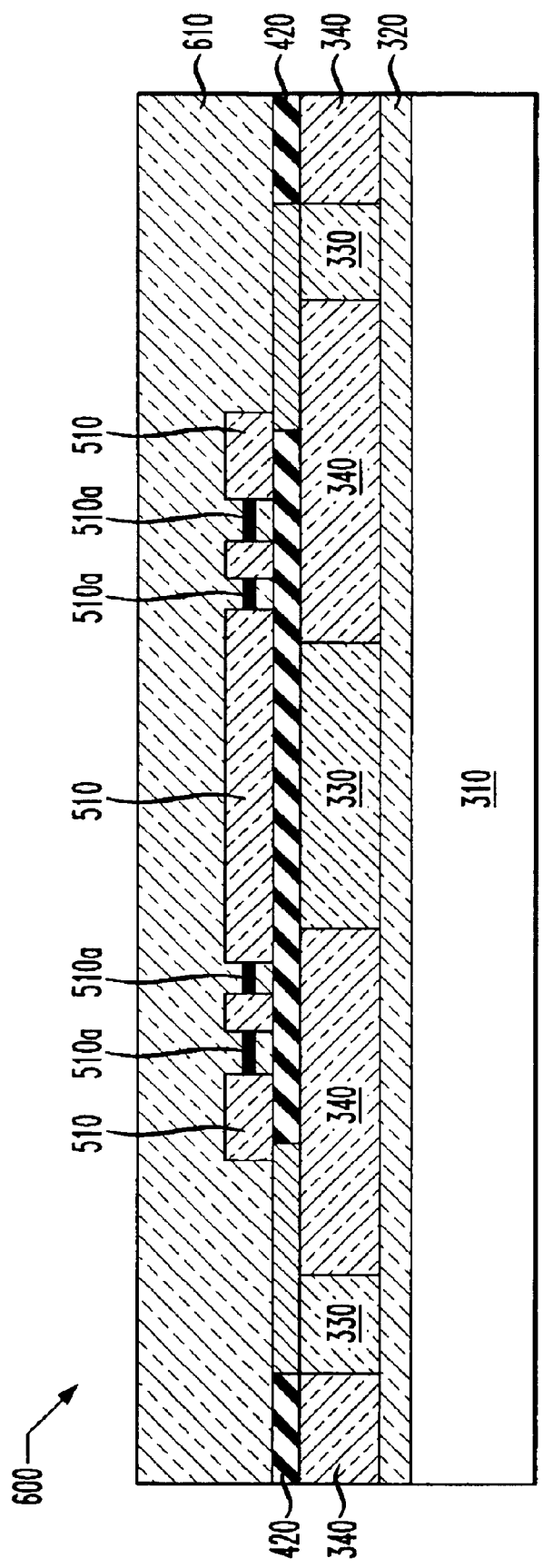

As FIG. 6 indicates, an embodiment of the device 600 where a third insulating layer 610 may be deposited after patterning and annealing the polysilicon layer 510. Portions of layer 510 that ultimately form both torsional members 510a are depicted in this figure, and FIGS. 7 and 8, for illustrative purposes. One skilled in the art readily understands, however, that torsional members 510a are situated at orthogonal edges of the final embodiment of the moveable element, as illustrated in FIG. 8. In a particular embodiment, the third insulating layer 610 may also be a phosphorous-doped silicon dioxide glass. Again, this intermediate structure may be patterned by conventional methods, such as photolithography or reactive ion etching.

Figure 7:
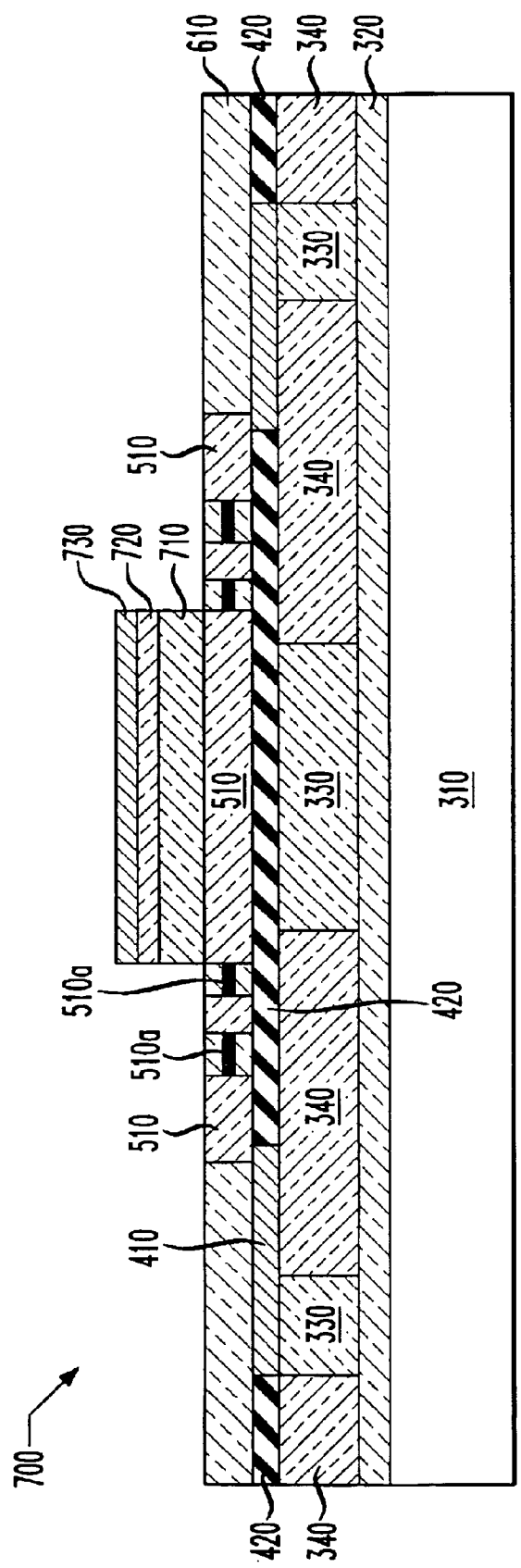

The process may continue according to FIG. 7 which illustrates an embodiment of the present invention 700 as the process nears completion. An undoped polysilicon layer 710 ("poly-2") is deposited on exposed portions of the device. Preferably this layer is deposited by any means known to one skilled in the art and may be designed to form a portion of the moveable element as depicted in FIG. 8. Once this undoped polysilicon layer 710 has been formed in the desired pattern, the entire structure may be annealed. Again, it is believed that this annealing causes the phosphorous in the insulating layers 420, 610 to migrate into adjacent polysilicon layers 510 and 710. Importantly, because polysilicon layer 410 has previously been subjected to annealing, it is believed that the polysilicon layer 510 experiences greater doping due to the preferential diffusion of the phosphorous into this layer.

After the structure has been annealed, a light reflective layer 730 may be formed over desired portions of the polysilicon layer 710 to form the moveable element. In certain embodiments the light reflected layer 730 may be gold; however, any materials known in the art that are suitable for forming the light reflective layer of an microelectromechanical optical switching device and that can withstand the HF etching may be suitable. Other embodiments may have an adhesion layer 720 interposing polysilicon layer 710 and light reflective layer 730. In embodiments where the adhesion layer 720 is present, it may comprise chromium or titanium; however, any material capable of adhering a light reflective layer to polysilicon will be suitable.

As illustrated in FIG. 8, after the formation of the light reflective layer 730, an embodiment of the device 800 may be exposed to an etchant mixture to remove the sacrificial silica glass. Thus, one skilled in the art will understand that appropriate layers and regions described above will be designed to permit the etchant mixture to penetrate into the device to access and remove subsurface portions of the insulating layers 340, 420, and 610, to release the device 800.

In an advantageous embodiment, the etchant mixture of the present invention comprises an etchant and anion suppressant. For the purposes of the present invention an anion suppressant may be any substance that suppresses the formation of an anion present in the etchant mixture during the release process. Such materials may suppress anion reactivity through suppressing their formation, physically or chemically entrapping the anion, or otherwise rendering the anion inert. In some embodiments the anion suppressant may also be a corrosion suppressant. For the purposes of the present invention, a corrosion suppressant may be any substance that reduces the ability of the etchant to chemically or mechanically degrade polysilicon.

In order to reduce the attack on the silicon, an anion suppressant is added that changes the equilibrium of the HF reaction with water. While the anion concentration is suppressed, the reaction of HF with silica glass in unaffected. However, if too much anion suppressant is added, the adhesion promoting metal layers (e.g., chromium or titanium) if they are exposed to HF, because they are less noble than gold, can be oxidized. This would result in lifting and delaminating of the gold layer.

In certain embodiments of the present invention the anion suppressant may be an acid. Particularly useful acids include acetic acid, hydrochloric acid, sulfuric acid, and phosphoric acid. However, other materials that serve to suppress the reactivity of anions will be useful. The concentration of the anion suppressant in the etchant mixture may range from less than about 0.0001 moles/liter to less than about 5.0 moles/liter. In certain embodiments, the anion suppressant may be present at a concentration ranging from 0.0001 moles/liter to 1 mole/liter. In one exemplary embodiment, the concentration of anion suppressant is approximately 0.5 moles/liter and the concentration of etchant is about 22.8 moles/liter.

Preferably, the anion suppressant is not present in a concentration that deleteriously effects other layers of the device or the removal of the insulating layers. Such effects may be evidenced by over-etching of the insulating layers or pitting of metal layers such as the light reflective layer 730 or adhesion layer 720. Thus, a suitable etchant mixture will contain etchant and anion suppressant concentrations sufficient to remove desired portions of surface and subsurface insulating layers, yet leave the properties of other portions of the device substantially unharmed.

Figure 9:
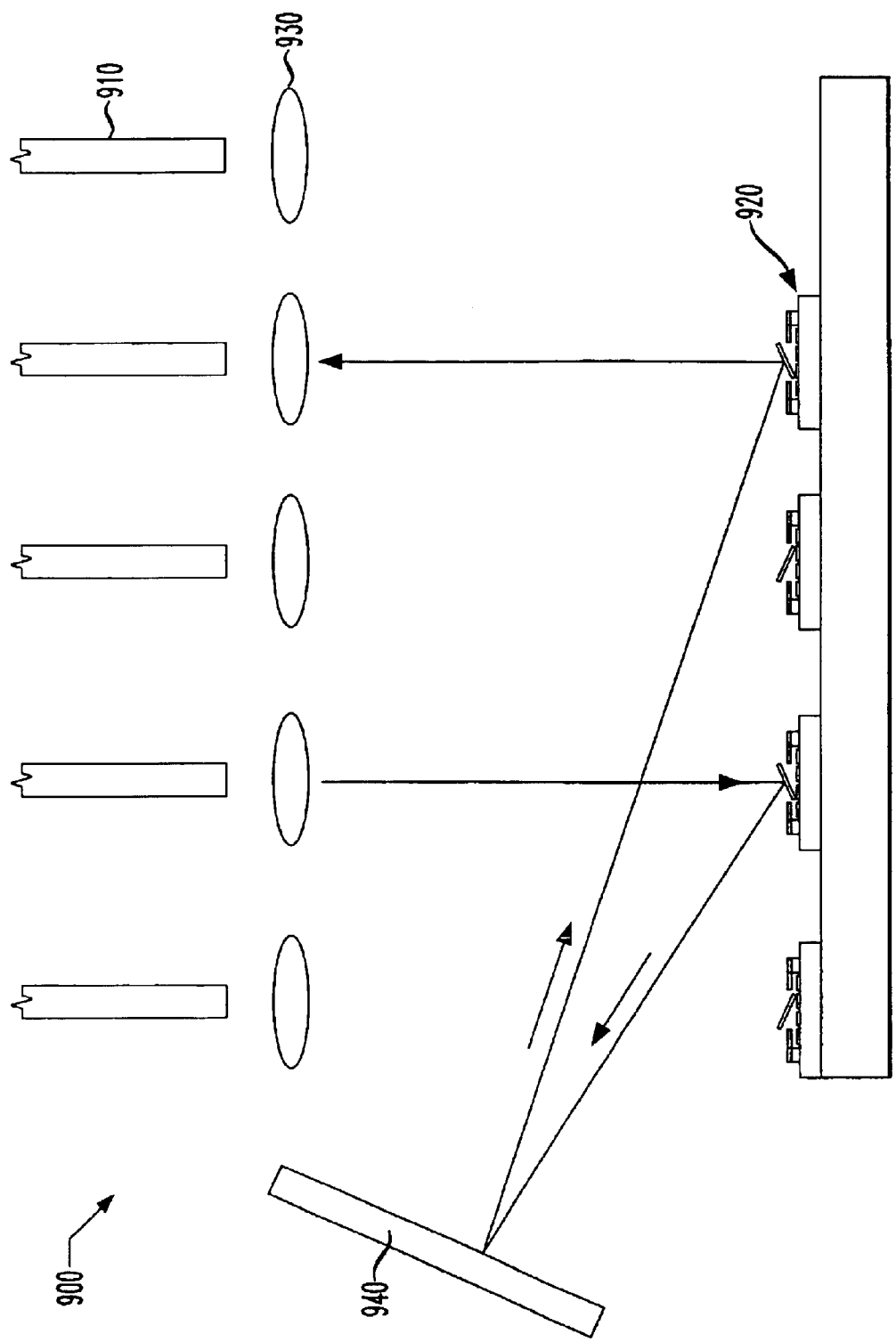
FIG. 9 illustrates an optical communications system incorporating a MEMS device of the present invention.

Turning to FIG. 9, illustrated is an optical communications system 900. In the embodiment shown in FIG. 9, the optical communications system 900 includes input/output fiber bundles 910, the MEMS device 920 illustrated in FIGS. 2A 2B and 2C, or FIG. 8, imaging lenses 930 interposed between the input/output fiber bundles 910 and the MEMS device 920, and a reflector 940. The optical communications system 900 represents an optical cross-connect, which is one environment where the MEMS device 920 may be used.

The inventive methods and structures described herein may also be applied to a variety of other devices. Any system or device comprising polysilicon portions may be improved by incorporating substantially non-corroded polysilicon portions. It should further be understood that the above-described embodiments are illustrative of only a few of the many possible specific embodiments which may represent applications of the present invention. Numerous and varied other arrangements can be made by those skilled in the art without departing from the spirit and scope of the present invention.

As previously noted, when an etchant is used to remove sacrifical material from a structure with dissimilar materials, an electrochemical cell is formed with materials that have different RedOx potentials. The following example is by way of illustration and not intended to limit the scope of the invention.

For the structure illustrated in FIG. 8, suppose the etchant used to remove the sacrificial material 340 is a standard buffered HF solution. Buffered HF etchant solutions are well known to one skilled in the art and are aqueous solution that contain hydrofluoric acid (HF) and ammonium fluoride ($NH_4F$). In the aqueous etchant, fluoride ions are generated. The fluoride ions do not appreciably corrode the polycrystalline silicon. However, the presence of a metal such as gold (with a large, positive RedOx potential of +1.42 (vs. an hydrogen reference electrode) favors the reaction between the fluorine ions and the polycrystalline silicon, thereby causing the polycrystalline torsional members to corrode. The acid additive is selected to reduce the concentration of the fluoride ions, thereby reducing the corrosion of the polycrystalline torsional elements.

EXAMPLES

The corrosion preventing ability of acid additive formulations of HF prepared according to the present invention were compared to a conventional HF formulation with no additive. Torsional members made according to the present invention were immersed in either 49% HF alone, or with one of three additives included, for 10 minutes at room temperature. Corrosion was assessed by visually observing the torsional members under a light microscope at 400× power. Corrosion free surfaces appear as a metallic gray, while corroded surfaces tend to darken and discolor. The degree of torsional member corrosion was therefore assigned to one of six categorical indexes ranging from substantially corrosion free (0) to maximal discoloration (5).

As illustrated in Table 1, as the concentration of the acid additive is increased, the discoloration, and hence corrosion is reduced. Conversely, as the concentration of fluoride ion is increased, for example by the addition of ammonium fluoride, corrosion worsens (not shown). For each of the acid additives shown in Table 1, concentrations were determined where the torsional members were substantially corrosion free. Conversely, at extremely high acid additive concentrations, 5 M HCl for example, the reflective layer of the moveable element, here composed of gold in the devices tested, delaminated.

TABLE 1

| Additive | Concentration (moles/liter) | Discoloration (0 = None; 5 = Severe) |
|---|---|---|
| None | 0 | 5 |
| Hydrochloric acid | 0.0001 | 3 |
| " | 0.0002 | 1 |
| " | 0.0010 | 0 |
| " | 5 | 0 - gold delaminates |
| Sulfuric acid | 0.0001 | 0 |
| " | 0.0100 | 0 |
| Acetic acid | 0.0010 | 4 |
| " | 0.0100 | 0 |

The response characteristics, of a micro-electromechanical device constructed according to the principles of the present invention, as well as the response characteristics a prior art device, was assessed in two experiments.

The first experiment measured the displacement characteristics of a moveable element, coupled to substantially corrosion free torsional members fabricated according to the present invention. Displacement of the moveable element edge was measured in response to transient electric fields, produced by applying a voltage of about 7 volts to the electrode within the device, over a frequency range of about 0.2 kHz to 1.6 kHz. The transient electric fields caused the moveable element to gimbal in resonance, including tilting about its primary axis of rotation. In turn, tilting caused the edge of the moveable element to be displaced from the plane of a support plane coupled to the moveable element.

Figure 10:
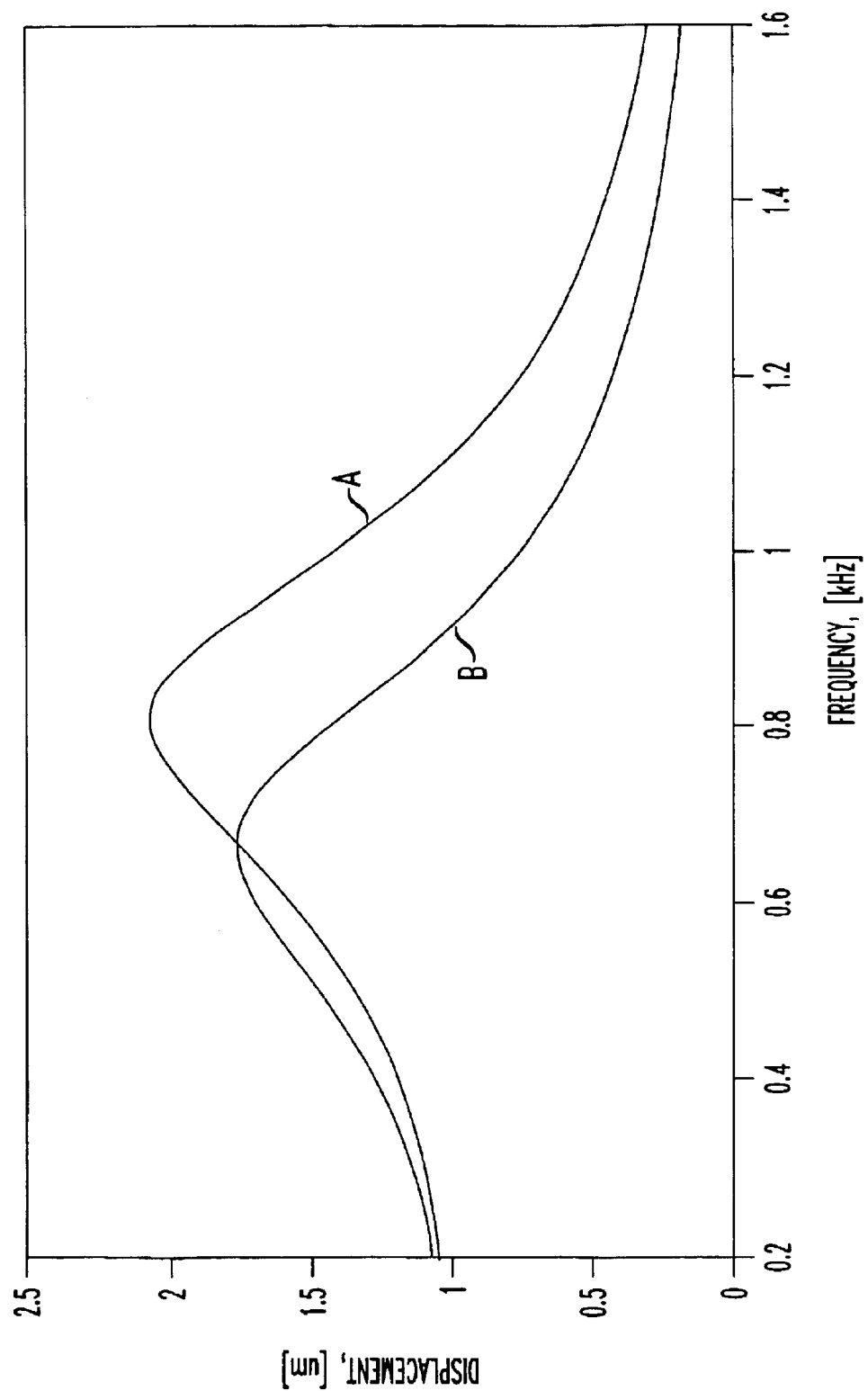
FIG. 10 illustrates response characteristics, here mirror displacement, for a MEMS device constructed according to the principles of the present invention, and the response characteristics a prior art device.

Curve A in FIG. 10 shows a displacement response of such a moveable element incorporated into a device constructed according to the present invention. The displacement of the moveable element's edge tended to be a smoothly varying function, ranging from about 0.25 $\mu$m to greater than about 2.0 $\mu$m for resonance frequencies ranging between about 0.2 KHz to about 1.6 kHz. The, device in one embodiment, exhibited a moveable element edge displacement between 1.5 $\mu$m to about 2 $\mu$m for resonance frequencies from about 0.6 kHz to about 1.0 kHz. The device also exhibited a maximal moveable element edge displacement of at least about 1.75 $\mu$m, when the resonance frequency ranges from about 0.67 kHz to about 0.93 kHz.

In contrast, Curve B in FIG. 10 shows a broader displacement response obtained for a moveable element coupled to conventionally made torsional members, and incorporated into a MEMS device otherwise having the same dimensions as the device producing results corresponding to Curve A, and exposed to the same transient electric fields. The maximal moveable element edge displacement never exceeded 1.75 $\mu$m, and occurred at a lower resonance frequency of about 0.6 kHz. Moreover, at all frequencies greater than about 0.65 kHz, the displacement was lower than the displacement obtained from the device produced according to the present invention, shown in Curve A.

The second experiment measured the distribution of tilt angles characteristics of a moveable element coupled to substantially corrosion free moveable elements and contained within a device produced according to the present invention. If a fixed voltage is continuously applied to one electrode within such a device, the moveable element, in response to the transient electric field generated, rotated about its primary axis to a range of tilt angles having particular average values, designated as the primary tilt angle. The distribution of tilt angles for a fixed voltage was affected by the extent of corrosion of torsional members coupled to the moveable element.

Figure 11:
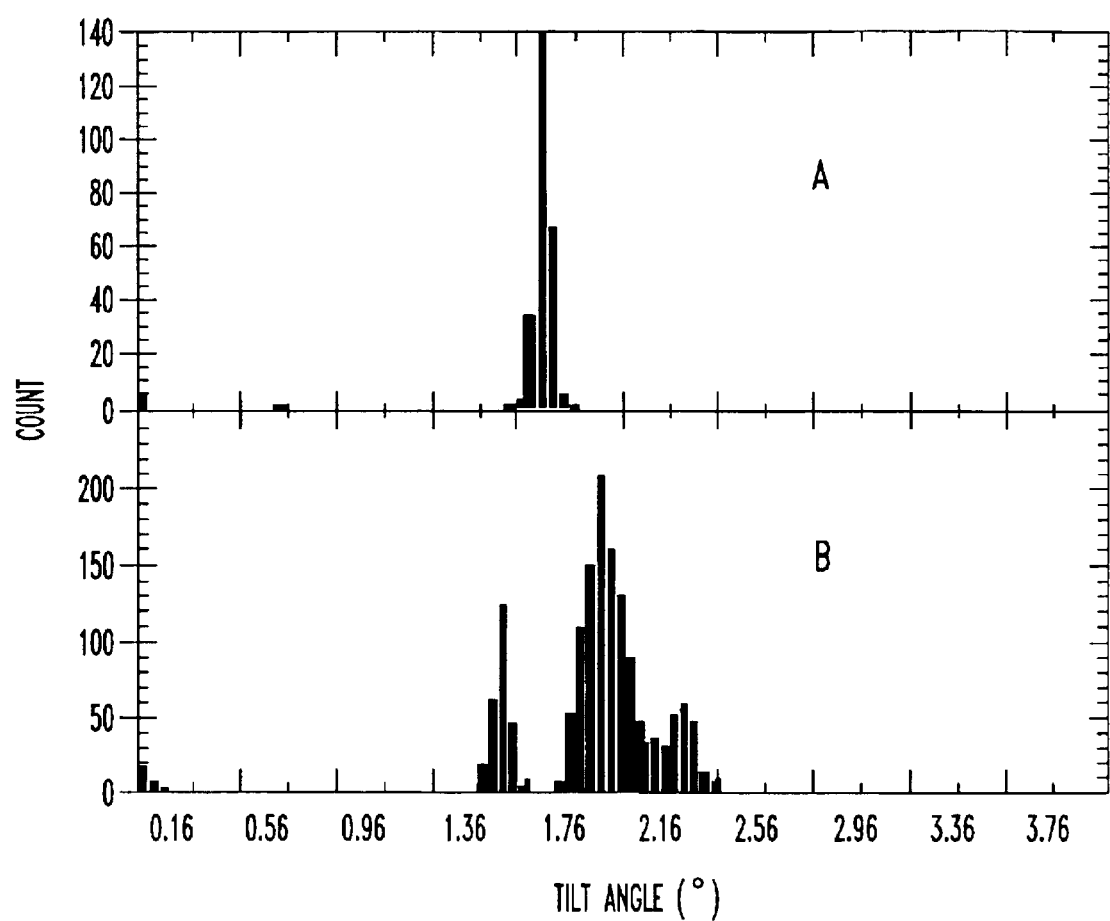
FIG. 11 illustrates response characteristics, here tilt angle, for a MEMS device constructed according to the principles of the present invention, and the response characteristics a prior art device.

Curve A in FIG. 11 shows a narrow distribution of tilt angles obtained for such a moveable element incorporated into a device constructed according to the present invention. The average tilt angle about the moveable element's primary axis of rotation was about 1.6° with at least about 90 percent of all responses falling within ±0.4°. Thus, the moveable element rotated around its primary axis to within 25 percent of its primary tilt angle.

In contrast, Curve B in FIG. 11 shows a broader distribution of tilt angles obtained for a moveable element coupled to conventionally made torsional members, and incorporated into a MEMS device otherwise having the same dimensions as the device producing results corresponding to Curve A, and exposed to the same transient electric fields.

Although the present invention has been described in detail, those skilled in the art should understand that they can make various changes, substitutions and alterations herein without departing from the spirit and scope of the invention in its broadest form.

What is claimed is:

1. A micro-electro-mechanical device, comprising:
   moveable elements support structure;
   a moveable elements supportable by said moveable elements support structure wherein the moveable elements support structure and moveable elements are comprised of dissimilar material; and
   torsional members substantially free of corrosion, coupled to said moveable elements support structure and said moveable element allowing said moveable elements to gimbal with respect to said support structure, and wherein said torsional members allow said moveable element to rotate around an axis of rotation to a desired tilt angle in response to a repeated electrostatic field, such that actual tilt angle values are within ±0.4 degrees of the desired tilt angle.

2. The micro-electro-mechanical device as recited in claim 1, wherein said desired tilt angle is between about 1.2 degrees and about 2 degrees.

3. The micro-electro-mechanical device as recited in claim 1 where an edge of said moveable elements is displaced from a plane parallel to said support structure by about 1.5 $\mu$m to about 2 $\mu$m when said repeated electrostatic field ranges from a frequency of about 0.6 kHz to about 1.0 kHz.

4. The micro-electro-mechanical device as recited in claim 1, where an primary edge of said moveable element is displaced from a plane of said support structure by at least about 1.75 $\mu$m when said repeated electrostatic field ranges from a frequency of about 0.67 kHz to about 0.93 kHz.

5. The micro-electro-mechanical device as recited in claim 1 wherein said torsional members are comprised of a polysilicon material.

6. The micro-electro-mechanical device as recited in claim 5 wherein said polysilicon material includes a dopant having a dopant concentration up to about 1.0 atomic weight percent.

7. The micro-electro-mechanical device as recited in claim 6 where said dopant is phosphorus.

8. The micro-electro-mechanical device as recited in claim 1 wherein said moveable element is a mirror that comprises a silicon layer and an overlying adhesive layer and a reflective layer.

9. The micro-electro-mechanical device as recited in claim 8 wherein said reflective layer is selected from a group consisting of:
   gold;
   silver;
   rhodium;
   platinum;
   copper; and
   aluminum.

10. The micro-electro-mechanical device as recited in claim 8 wherein said adhesive layer is selected from a group consisting of:
    chromium; and
    titanium.

11. A method of fabricating a micro-electro-mechanical device, comprising:
    forming a plurality of layers on a supporting substrate wherein at least a portion of one layer is a sacrificial layer;
    defining at least one torsional member in at least one layer of said layers that is not said sacrificial layer;
    defining a movable element in at least one of said layers that is not said sacrificial layer, wherein said moveable element is attached to said torsional member; and removing said sacrificial layer to permit said movable element to move relative to said substrate, wherein said sacrificial layer is removed using an etchant mixture including an anion suppressant, wherein said anion suppressant is selected to inhibit corrosion of said torsional member by said etchant mixture.

12. The method as recited in claim 11 wherein defining said movable element includes constructing a moveable element support structure and a moveable element supported by said moveable element support structure, wherein the moveable element support structure and moveable element are comprised of dissimilar materials.

13. The method as recited in claim 11 wherein said etching mixture includes hydrogen fluoride and said anion suppressant is an avid other than hydrogen fluoride.

14. The method as recited in claim 13 wherein said acid is selected from a group consisting of:

sulfuric acid;

acetic acid; and hydrogen chloride.

15. The method as recited in claim 13 wherein said acid is hydrogen chloride and a concentration of said hydrogen fluoride is 22.8 moles/liter and a concentration of said hydrogen chloride that ranges from less than about 0.0001 moles/liter to less than about 0.1 moles/liter.

16. The method as recited in claim 11 wherein forming includes:

forming first, second and third doped silicon layers having doped oxide layers located therebetween;

diffusing a dopant from said doped oxide layers into said first, second and third silicon layers;

depositing an adhesion layer on said third silicon layer; and depositing a reflective layer on said adhesion layer.

17. The method as recited in claim 16 wherein said dopant has a concentration up to about 1.0 atomic weight percent.

18. The method as recited in claim 16 wherein said dopant is phosphorus.

19. A method of manufacturing an optoelectronic device, comprising:

constructing input/output fiber bundles;

constructing a micro-electro-mechanical device, including:

forming a plurality of layers on a supporting substrate wherein at least a portion of one layer is a sacrificial layer;

defining at least one torsional member in at least one layer of said layers that is not said sacrificial layer;

defining a movable element in at least one of said layers that is not said sacrificial layer, wherein said moveable element is attached to said torsional member; and removing said sacrificial layer to permit said movable element to move relative to said substrate, wherein said sacrificial layer is removed using an etchant mixture including an anion suppressant, wherein said anion suppressant is selected to inhibit corrosion of said torsional member by said etchant mixture; and constructing imaging lenses interposed between said input/output fiber bundles and said micro-electro-mechanical device.

20. The method as recited in claim 19 wherein constructing said micro-electro-mechanical device includes constructing a moveable element support structure and a moveable element supported by said moveable element support structure, wherein the moveable element support structure and moveable element are comprised of dissimilar materials.

21. The method as recited in claim 19 wherein said etchant mixture includes an anion suppressant that is an acid other than hydrogen fluoride.

22. The method as recited in claim 19 wherein said etchant mixture includes an etching component and a corrosion suppressant.

23. The method as recited in claim 22 wherein said etching component is hydrogen fluoride and said corrosion suppressant is an acid wherein said acid is acetic acid, hydrogen chloride or sulfuric acid and a concentration of said hydrogen fluoride is 22.8 moles/liter and a concentration of said acid that ranges from less than about 0.0001 moles/liter to less than about 0.1 moles/liter.

* * * * *